United States Patent
Sleiman

(10) Patent No.: US 9,493,194 B1
(45) Date of Patent: Nov. 15, 2016

(54) TRUCK BED EXTENDER

(71) Applicant: Tony Sleiman, Windsor (CA)

(72) Inventor: Tony Sleiman, Windsor (CA)

( * ) Notice: Subject to any disclaimer, the term of this patent is extended or adjusted under 35 U.S.C. 154(b) by 105 days.

(21) Appl. No.: 14/608,566

(22) Filed: Jan. 29, 2015

(51) Int. Cl.
    B62D 33/08     (2006.01)
    B62D 27/06     (2006.01)

(52) U.S. Cl.
    CPC ............ B62D 33/08 (2013.01); B62D 27/06 (2013.01)

(58) Field of Classification Search
    CPC ............ B60R 9/06; B60P 3/40; B62D 33/08
    See application file for complete search history.

(56) References Cited

U.S. PATENT DOCUMENTS

| | | | | |
|---|---|---|---|---|
| 5,615,813 A | * | 4/1997 | Ouellette | B60P 3/40 224/405 |
| 5,752,636 A | * | 5/1998 | Manley | B60R 9/06 224/403 |
| 7,967,311 B2 | * | 6/2011 | Phillips | B60R 9/06 280/163 |
| 8,919,627 B2 | * | 12/2014 | Brinkley | B60P 3/10 224/519 |
| 9,254,988 B1 | * | 2/2016 | Caspersen | B66C 23/46 |

* cited by examiner

*Primary Examiner* — Sarah McPartlin

(57) ABSTRACT

A truck bed extender including an elongated support tube having a first and a second end whereby the first end is adapted for securement in a trailer hitch mounted on a truck, and two support arms pivotally mounted at the second end of the elongated support tube, for pivotal rotation from a collapsed position generally alongside the elongated support tube, to an angled position extending upwardly away from the elongated support tube. The support arms, when rotated upward rest on two rectangular shaped cam adjusters that are pivotally mounted on the sides of the elongated support tube at the second end, just behind the support arms. The support arm height is adjusted by rotating the cam adjusters. A crossbar is removed from its stored position inside the hollow, elongated support tube and mounted with a removable lock pin perpendicular and on top of the support arms.

4 Claims, 5 Drawing Sheets

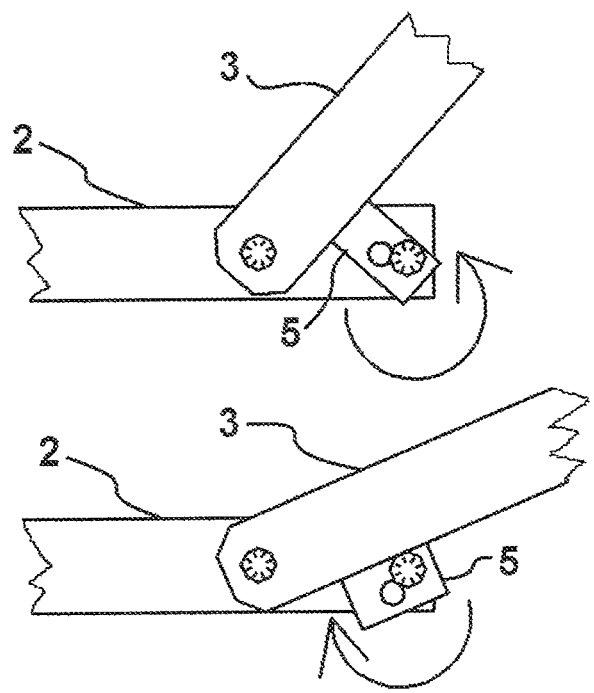
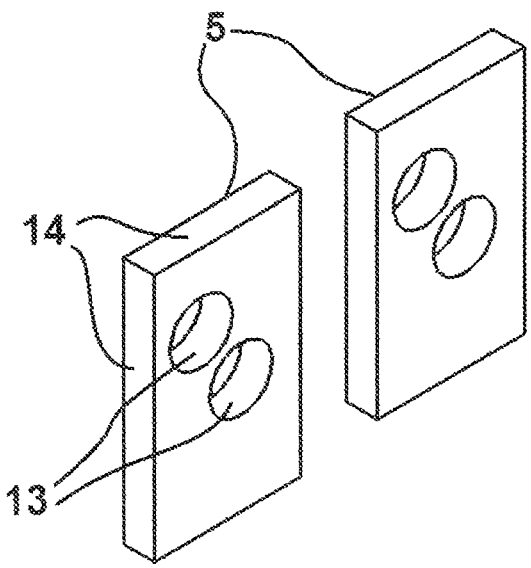
Fig. 6
Fig. 7

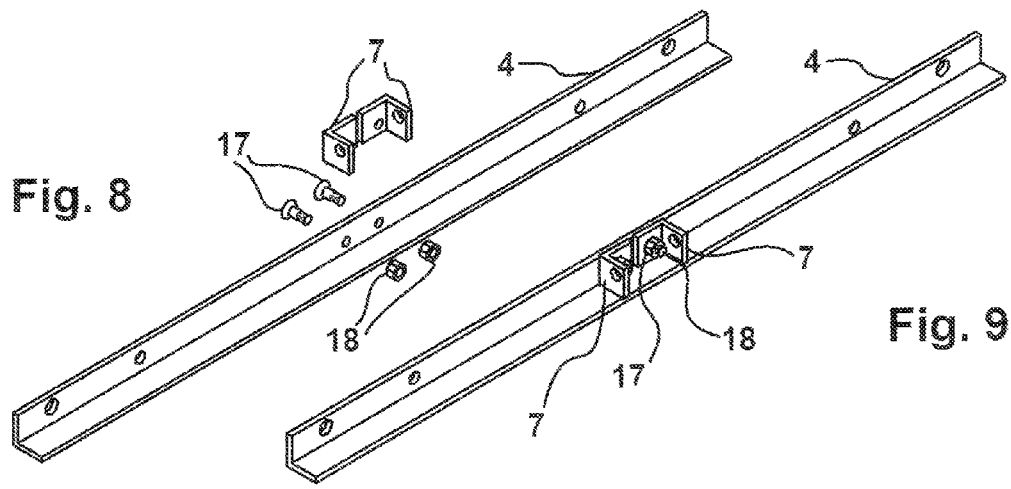
Fig. 8
Fig. 9
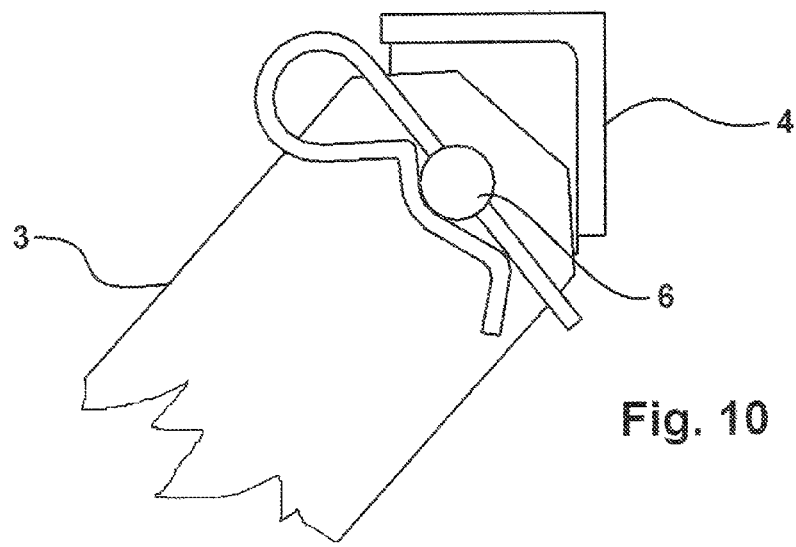
Fig. 10

TRUCK BED EXTENDER

CROSS-REFERENCE TO RELATED APPLICATION

This application claims the benefit of U.S. Provisional Patent Application Ser. No. 61/945,997, filed Feb. 28, 2014, the entire specification of which is expressly incorporated herein by reference.

FIELD OF THE INVENTION

This invention relates, generally, to devices for extending the bed length of a vehicle that upon which items may be transported, and more particularly, to such devices which are mounted to the vehicle using the standard receiver hitch already attached to the vehicle.

BACKGROUND OF THE INVENTION

It is often necessary to carry long items in the bed of a pickup truck, van or SUV where the load extends out past the rear end body of the vehicle and when transported, the load may fall out or become damaged during transport due to a lack of support. It would be desirable, therefore, to have a bed extender system that could be used to provide additional support for oversized items and be collapsible to fit into a tight space for storage when not in use while being lightweight enough to be carried and handled with one hand if necessary. The bed extenders in the prior art accomplish the task of supporting long items in transportation but do not collapse enough to store in tight spaces when not in use and they are too heavy to handle with one hand. They require drilling many holes to achieve the desired height and also require welding to build which raises the cost of manufacturing. An example U.S. Pat. No. 5,451,088 issued on Sep. 19, 1995 to Broad; U.S. Pat. No. 5,458,389 issued on Oct. 17, 1995 to Young; U.S. Pat. No. 5,649,656 issued on Jul. 22, 1997 to Davy; U.S. Pat. No. 5,678,743 issued on Oct. 21, 1997 to Johnson, et al, show bed extenders that collapse into more than one piece, requiring additional storage space as well as making them heavy and cumbersome to handle with one hand. In U.S. Pat. No. 8,070,028 issued on Dec. 6, 2011 to Segeren, et al, the bed extender can be folded in one piece for storage but still occupies a lot of space and is also very heavy as a result of the folding feature. In all the cited prior art, welding is the method used for attaching their components and height adjustments are made by inserting a pin in one of several holes that are drilled in the assembly, which raises the cost of manufacturing.

SUMMARY OF THE INVENTION

A device is provided for extending a vehicle bed upon which items may be transported. The device is attachable to the vehicle using the receiver hitch already permanently attached to the vehicle. The present invention is a compact, lightweight truck bed extender, which can easily be installed, removed, collapsed, and folded in one piece to store in a small space in the cab of any vehicle when not used. The present invention is built using standard bolts and locking nuts and does not require any welding, which ultimately reduces the cost of manufacturing. Height adjustments are achieved by rotating rectangular shaped cams which eliminate the need to drill several holes, which further reduces the cost of manufacturing. The invention comprises of an elongated, support tube having a first and second end. The first end is inserted into the vehicle's receiver hitch and secured with a standard hitch pin and two support arms are pivotally mounted to the second end. The support arms rotate upward and rest on two rectangular shaped cams that are pivotally mounted just behind the support arms on the second end of the elongated support tube. A horizontal support crossbar is removeably mounted to the top of the support arms with a lock pin. In the collapsed position, the elongated support tube is slid out of the vehicle trailer hitch, the horizontal support crossbar is removed from the support arms and inserted inside the elongated support tube. The support arms are folded along the sides of the elongated support tube and the lock pin is inserted through the aligned holes of the support arms and elongated support tube that locks the entire assembly as one unit for storage when not in use.

BRIEF DESCRIPTION OF THE DRAWINGS

The present invention will become more fully understood from the detailed description and the accompanying drawings.

FIG. 6 is a close up side view of the height adjustment feature by rotating the cam adjusters to establish various heights of the support arms;

FIG. 7 depicts an isometric view of the cam adjusters with offset holes;

FIG. 8 depicts an isometric exploded view of the crossbar assembly;

FIG. 9 depicts an isometric view of a fully assembled crossbar assembly;

FIG. 10 depicts a close up, side view of the crossbar mounted position on the support arms;

DETAILED DESCRIPTION OF THE DRAWINGS

The following description of the preferred embodiment(s) is merely exemplary in nature and is no way intended to limit the invention, its application, or uses.

Figure 1:
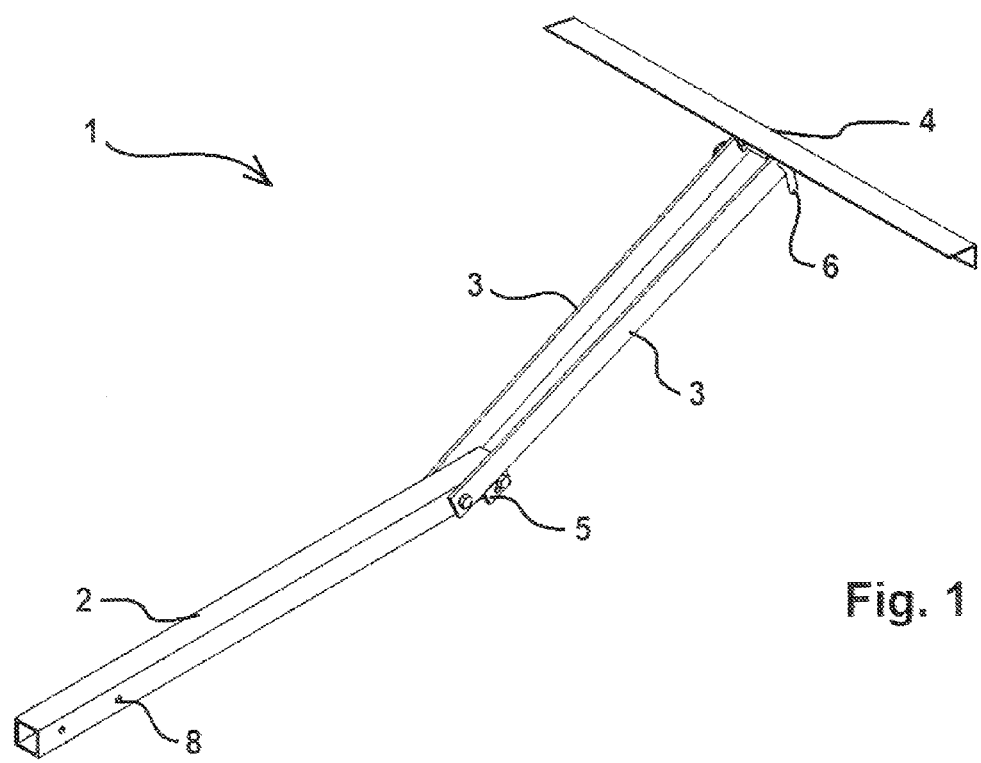
FIG. 1 depicts an isometric view of the bed extender in its open position.

Referring to FIG. 1, there is shown bed extender 1, in its open position. The support arms 3 are fabricated from flat, cold rolled steel bar stock and are pivotally attached by bolts and locking nuts to the sides of one end of elongated support tube 2, which is made from cutting a length of square steel tubing.

The cam adjusters 5 are fabricated from the same material as the support arms 3, flat cold rolled steel bar stock, and are pivotally attached to the sides and at the end of elongated support tube 2 just behind support arms 3 using bolts with locking nuts. The support arms 3 rest on the cam adjusters 5 when rotated upwardly from the folded position. The crossbar 4 is cut from angled aluminum preferably for weight reduction and is attached to the top of the support arms 3 with lock pin 6.

Figure 2:
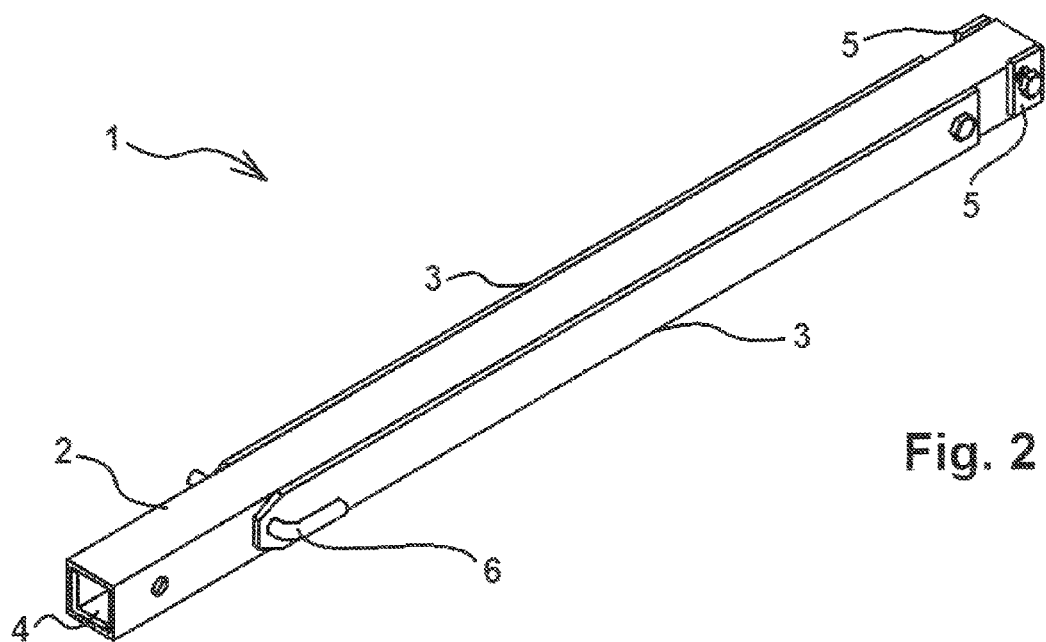
FIG. 2 depicts an isometric view of the bed extender in its collapsed position.

Referring to FIG. 2, there is shown the bed extender 1 in its closed position. The crossbar 4 is stored inside elongated support tube 2 and the entire assembly is locked in place with lock pin 6 through aligned holes, thus creating a very compact, low profile unit for storing in a very tight space as opposed to the larger, heavy and cumbersome inventions in prior art, which cannot be stored in tight spaces.

Figure 3:
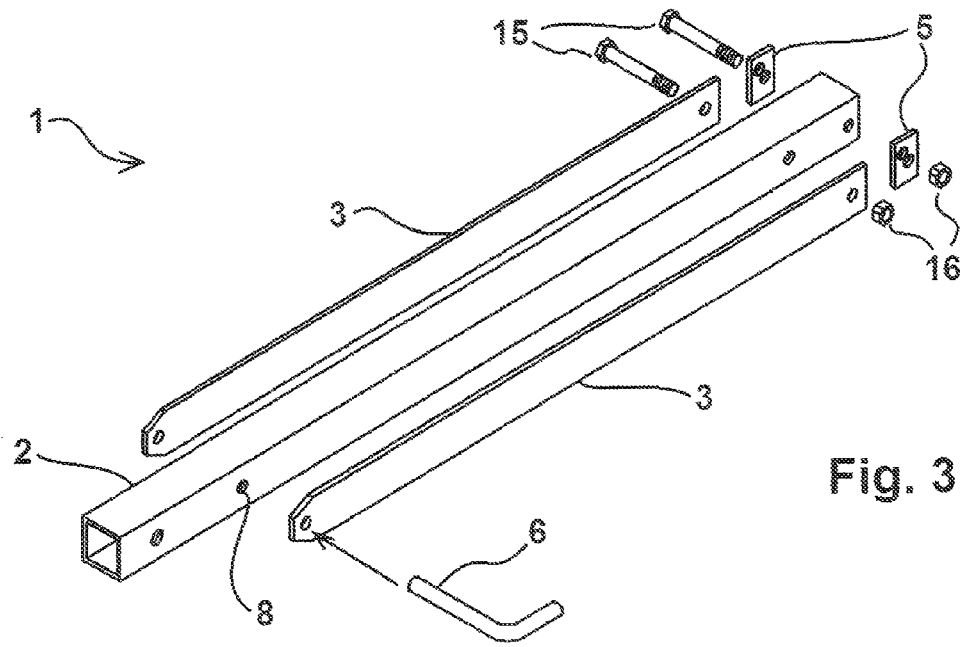
FIG. 3 depicts an isometric exploded view of the bed extender in accordance with the general teachings of the present invention.

Referring to FIG. 3, there is shown and exploded view of bed extender 1, which includes the support tube 2, support arms 3, cam adjusters 5, lock pin 6, hole 8 for locking the assembly in a closed position.

Figure 4:
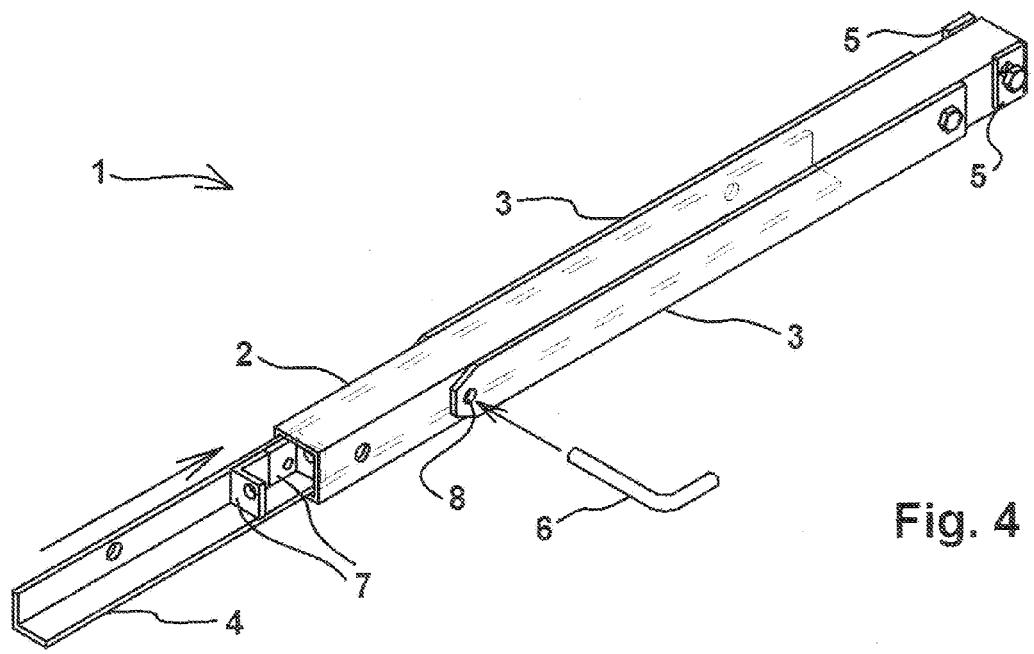
FIG. 4 depicts an isometric view of a collapsed bed extender with the crossbar being inserted inside the support tube for storage.

Referring to FIG. 4, there is shown the bed extender 1 with crossbar brackets 7 which are made by cutting angled aluminum lengths, which is the same material as crossbar 4 mounted to crossbar 4 and crossbar 4 is inserted inside elongated support tube 2 and support arms 3 folded along the sides parallel to said elongated support tube 2. The crossbar brackets 7 allow the crossbar 4 to fit inside said elongated support tube 2 thus allowing for storage in a very small space.

Figure 5:
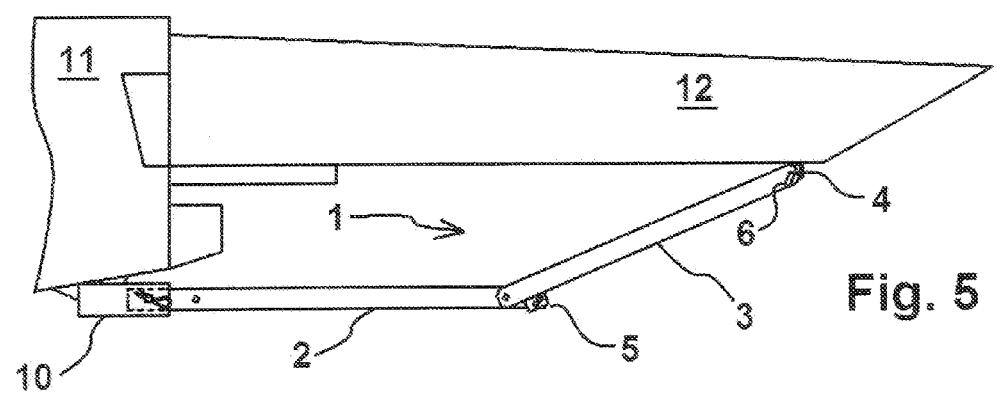
FIG. 5 depicts a side view of the bed extender supporting an item such as a kayak in the back of a truck.

Referring to FIG. 5, there is shown a truck 11 carrying a kayak 12 supported by crossbar 4, which is removably mounted on support arms 3 by lock pin 6, whereby support arms 3 are pivotally mounted on elongated support tube 2 and supported at the desired height by cam adjusters 5, which are pivotally mounted to said elongated support tube 2, which is inserted inside trailer hitch receiver 10.

Referring to FIG. 6, there is shown the bed extender 1 with the many height adjustment options achieved by rotating the cam adjusters 5 to the desired resting position for the support arms 3, therefore eliminating the need for drilling several height adjustment holes as in previous art inventions.

Referring to FIG. 7, there is shown cam adjusters 5 with offset holes 13, and the support surfaces 14.

Referring to FIG. 8, there is shown an exploded view of crossbar 4 with crossbar brackets 7, flat head bolts 17 and nuts 18.

Referring to FIG. 9, there is shown crossbar brackets 7 mounted to crossbar 4 by flat head bolts 17 and nuts 18.

Referring to FIG. 10 there is shown a close up side view of the crossbar 4 mounted to support arms 3 and secured with lock pin 6.

The description of the invention is merely in nature and, thus, variations that do not depart from the gist of the invention are intended to be within the scope of the invention. Such variations are not to be regarded as a departure from the spirit and the scope of the invention.

The invention claimed is:

1. A truck bed extender comprising: a cantilevered elongated support tube adapted at a first end for insertion into and securement in a trailer hitch mounted on a truck;
   a pair of support arms pivotally mounted on said elongated support tube at second end for pivotal rotation from a collapsed position generally alongside said elongated support tube to an upward angled position extending away from said elongated support tube;
   a pair of rectangular shaped cam supports are pivotally mounted to said elongated support tube at second end provide adjustable height support for said support arms in the upward angled position;
   a horizontal support crossbar is removably mounted to a top end of said support arms and secured with a lock pin; whereby said truck bed extender can readily be installed into a trailer hitch and erected to provide extended support for items placed in a truck bed, and can be readily collapsed for storage into a generally elongated condition with said horizontal support bar inserted inside said elongated support tube and said support arms extending generally alongside said elongated support tube.

2. The truck bed extender of claim 1 in which said support arms are pivotally mounted at the second end of said elongated support tube, such that they fold along the sides of said elongated support tube in the collapsed position.

3. The truck bed extender of claim 1 in which said rectangular shaped cam supports are pivotally mounted at the second end of said elongated tube, whereby providing support for said support arms and when rotated, they provide various height adjustments for said support arms.

4. The truck bed extender of claim 1 in which said lock pin is inserted through coaxially aligned holes on said elongated support tube and said support arms, whereby the whole assembly is locked together in an elongated, low profile condition for storage when not in use.

* * * * *